United States Patent
Sanders et al.

(10) Patent No.: US 12,234,922 B2
(45) Date of Patent: Feb. 25, 2025

(54) COATINGS FOR VALVE PARTS TO PREVENT EROSION

(71) Applicant: Dresser, LLC, Houston, TX (US)

(72) Inventors: Donald Stroman Sanders, Atlanta, GA (US); Cyril Nicolas Vlassoff, Saint-Georges des Groseillers (FR); Chad Eric Yates, Houston, TX (US); Jeremy Asher Glaun, Sharon, MA (US); Alexandre Serra Cachinhasky, Houston, TX (US)

(73) Assignee: Dresser, LLC, Houston, TX (US)

( * ) Notice: Subject to any disclaimer, the term of this patent is extended or adjusted under 35 U.S.C. 154(b) by 129 days.

(21) Appl. No.: 18/070,736

(22) Filed: Nov. 29, 2022

(65) Prior Publication Data

US 2024/0175506 A1    May 30, 2024

(51) Int. Cl.
*F16K 25/04*  (2006.01)
*B33Y 40/20*  (2020.01)
*B33Y 80/00*  (2015.01)

(52) U.S. Cl.
CPC .............. *F16K 25/04* (2013.01); *B33Y 40/20* (2020.01); *B33Y 80/00* (2014.12)

(58) Field of Classification Search
CPC .................................. F16K 25/04; F16K 25/005
See application file for complete search history.

(56) References Cited

U.S. PATENT DOCUMENTS

| | | | | |
|---|---|---|---|---|
| 4,732,364 | A * | 3/1988 | Seger ..................... | E21B 34/02 |
| | | | | 251/360 |
| 10,995,871 | B2 * | 5/2021 | Marya ................... | C23C 28/324 |
| 11,125,049 | B2 * | 9/2021 | Hoyle ..................... | E21B 34/02 |
| 11,280,422 | B1 * | 3/2022 | Brydon ................ | F16K 25/005 |

(Continued)

FOREIGN PATENT DOCUMENTS

| | | |
|---|---|---|
| CN | 203697597 U | 7/2014 |
| CN | 212107099 A | 12/2020 |

(Continued)

OTHER PUBLICATIONS

Masoneilan 74000 Series Erosion Resistant Valves (technical manual), Baker Hughes Company (2021).

(Continued)

*Primary Examiner* — Umashankar Venkatesan
(74) *Attorney, Agent, or Firm* — Paul Frank + Collins P.C.

(57) ABSTRACT

A closure member is configured for use in a valve. These configurations may have a coating or conformal layer that may cover most, if not all, of the underlying material. This layer may include pre-propagated cracks that form due to thermal cycling prior to use in service. These pre-propagated cracks act as stress relief to accommodate for possible thermal stress that occurs due to different rates of thermal expansion between the underlying closure member and the coating. In one implementation, the layer may include a crack profile, which is engineered to direct formation of the pre-propagated cracks as well as to arrest crack development (Continued)

to a certain depth to maintain at least some integral layer of material over the underlying plug 118. This feature can extend service life of the plug, particularly in highly-erosive process fluids, like particle-entrained fluids commonly found in hydrocracking or refining operations.

9 Claims, 6 Drawing Sheets

(56) References Cited

U.S. PATENT DOCUMENTS

| | | | | |
|---|---|---|---|---|
| 11,753,728 | B2* | 9/2023 | Guenther | C23C 28/322 251/315.03 |
| 11,840,453 | B2* | 12/2023 | Vlassoff | C01B 32/949 |
| 2014/0361208 | A1* | 12/2014 | Tsuji | F16K 27/102 251/368 |
| 2018/0010469 | A1 | 1/2018 | Kadau et al. | |
| 2019/0040551 | A1 | 2/2019 | Akiyama et al. | |
| 2019/0119805 | A1 | 4/2019 | Lin et al. | |
| 2020/0248819 | A1* | 8/2020 | Stadlberger | C23C 14/165 |
| 2022/0185678 | A1 | 6/2022 | Vlassoff et al. | |

FOREIGN PATENT DOCUMENTS

| | | |
|---|---|---|
| JP | 01-172683 A | 7/1989 |
| WO | 2021099873 A1 | 5/2021 |

OTHER PUBLICATIONS

Product manual, "Masoneilan 74000 Series Erosion Resistant Control Valves" (2021).

* cited by examiner

COATINGS FOR VALVE PARTS TO PREVENT EROSION

BACKGROUND

Flow controls are found in many industrial facilities. Power plants and industrial process facilities, for example, use different types of flow controls to manage flow of a material, typically fluids, throughout vast networks of pipes, tanks, generators, and other equipment. Control valves are useful to accurately regulate flow to meet process parameters. In oil and gas industry, operators may deploy control valves to control flow of debris-entrained fluids in hydrocracking or related processes.

Fluids in these processes are known to be highly-erosive. The materials may cause parts of the valve found directly in the flow to degrade rapidly. Presence of entrained solids, such as slurries, sand, coke, coal fines, or catalysts, within the process fluid may inhibit valve throttling, reduce total flow capacity, and potentially clog valves. Large pressure reductions of this complex fluid may produce outgassing, where solid, liquid, and vapor co-exist simultaneously in three-phase flow. The pressure reduction and resulting fluid expansion phase change may increase solid particle velocity within the fluid. These particles may act as a high-intensity "sand blaster" that erodes any surface within the flow path. Process parameters may intensify damage from these particles because temperatures, typically in the range of 400° C., tend to make materials even more susceptible to erosion, as well.

Other demanding process conditions may prevail as well. These conditions include vibrations, mechanical cycling (continuous throttling), and valve lift position. Thermal cycling can introduce alternating expansion and contraction loading. For parts with base materials and hardened coating materials with different expansion rates, thermal cycling can cause the coating or "overlay" to spall, flake, or generally separate from the base, exposing the base to the highly-erosive flow.

SUMMARY

The subject matter of this disclosure relates to improvements that can lengthen service life of parts that are subject to highly corrosive or erosive environments. Of particular interest are embodiments of parts with a coating or "skin" that exhibits a pre-defined cracking profile. This skin may employ materials that are highly resistant to erosion from persistent flow of highly-erosive working fluids. For valve plugs or "closure members," the embodiments may incorporate the material layer onto a "core" part. The cracking profile can direct or localize cracking of the surface in a known way. The part may undergo preliminary thermal cycling to induce these directed cracks within the cracking profile before it ships to a customer. This feature can act as stress relief, for example, to avoid additional cracking that results from thermal expansion of the core and material layer at different rates. The part may also use or integrate appropriate bonding materials to adhere the protective skin to the core part. This feature can ensure that pieces of the skin do not flake or fall off of the underlying structure to expose it to direct contact with the working fluid.

DRAWINGS

This specification refers to the following drawings.

Figure 1:
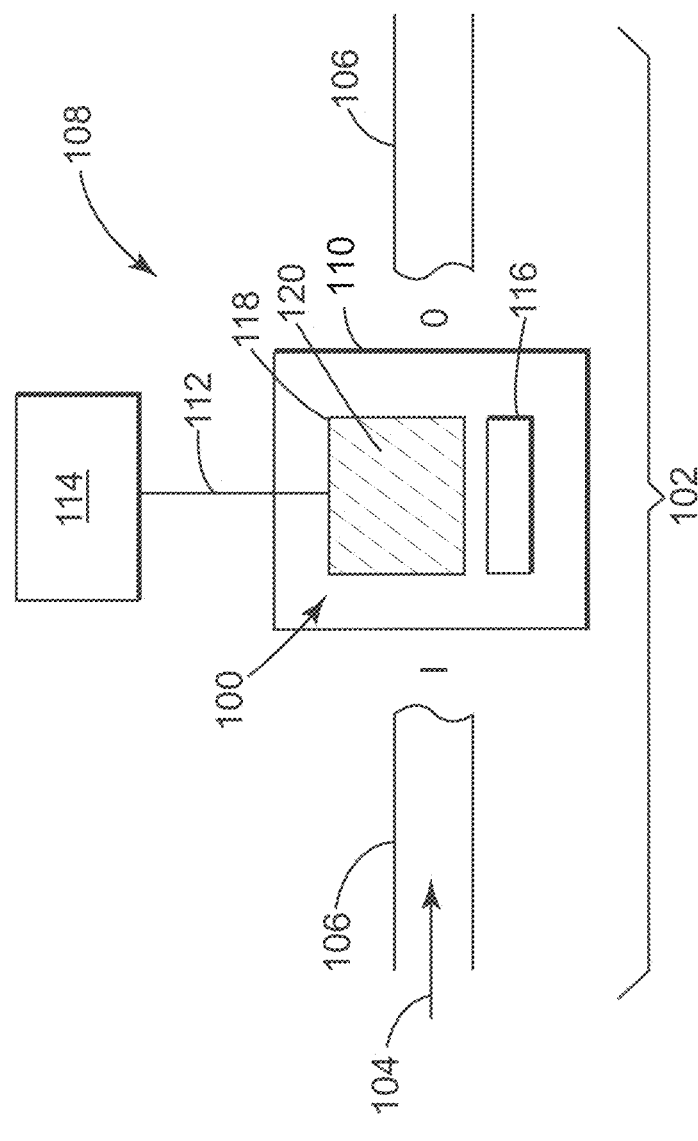
FIG. 1 depicts a schematic diagram of an exemplary embodiment of closure member.

These drawings and any description herein represent examples that may disclose or explain the invention. The examples include the best mode and enable any person skilled in the art to practice the invention, including making and using any devices or systems and performing any incorporated methods. The drawings are not to scale unless the discussion indicates otherwise. Elements in the examples may appear in one or more of the several views or in combinations of the several views. The drawings may use like reference characters to designate identical or corresponding elements. Methods are exemplary only and may be modified by, for example, reordering, adding, removing, and/or altering individual steps or stages. The specification may identify such stages, as well as any parts, components, elements, or functions, in the singular with the word "a" or "an;" however, this should not exclude plural of any such designation, unless the specification explicitly recites or explains such exclusion. Likewise, any references to "one embodiment" or "one implementation" does not exclude the existence of additional embodiments or implementations that also incorporate the recited features.

DESCRIPTION

The discussion now turns to describe features of the examples shown in the drawings noted above. These features prevent thermal stress cracking of conformal coatings that cover plugs or like closure members found on valves. Other embodiments are within the scope of this disclosure.

FIG. 1 depicts an example of a closure member 100. This example is found in a distribution network 102, typically designed to carry material 104 through a network of conduit 106. The network 102 may include a flow control 108 that has a valve body 110 to connect in-line with the conduit 106. A valve stem 112 may couple the closure member 100 with an actuator 114. This arrangement can manage the position of the closure member 100 relative to a seat 116. In one implementation, the closure member 100 may form a plug 118 with a coating 120.

Broadly, the closure member 100 may be configured to better survive harsh working fluids or like operating conditions. These configurations may embody parts that use different materials in different (and often strategic) locations, particularly locations that reside in flow of the working fluid. The parts may help regulate flow through a valve; although the concepts here may apply to other functions within these types of devices.

The distribution system 102 may be configured to deliver or move resources. These configurations may embody vast infrastructure. Material 104 may comprise gases, liquids, solids, or mixes, as well. The conduit 106 may include pipes or pipelines, often that connect to pumps, compressors, vessels, boilers, and the like. The pipes may also connect to tanks or reservoirs. In many facilities, this equipment forms complex networks.

The flow control 108 may be configured to regulate flow of material 104 through the conduit 106 in these complex networks. These configurations may include control valves and like devices. The valve body 110 is often made of cast or machined metals. This structure may form a flange at openings I, O. Adjacent pipes 106 may connect to these flanges. The valve stem 112 may form an elongate cylinder or rod that directs a load from the actuator 114 to the closure member 100. The load may result from compressed air along with a piston, spring (or springs), or a flexible diaphragm. This feature helps locate the closure member 100 in a desired position relative to the seat 116. This desired position or "set point" may correspond with flow parameters for the material 104 to meet process requirements or parameters. The plug 118 may move relative to the seat 116 to meet or achieve the set point. Movement is generally along an axis of the seat 116, or "up" or "down" for those valves that orient vertically on the process line. As noted, the position of the plug 118 may correspond directly with the flow rate of natural gas (or other resource) that flows through the seat 116 (or from its upstream side to its downstream side).

The coating 120 may be configured to protect the plug 118. These configurations may include layers that are less likely to breakdown or erode over time in service. The layers may include structure to regulate or self-regulate crack propagation, for example, stress reliefs that direct cracks to form in certain areas or under certain conditions. The reliefs may react to thermal variations or cycling that the part may encounter in service. Additive manufacturing techniques may deposit the layers to ensure strong bonds with underlying material of the plug 118. These techniques may also help to integrate any stress reliefs or other cracking profile (or geometry) as part of the deposited layer. For example, the layer may thin at or along the stress reliefs. The part may undergo pre-emptive thermal cycling to cause or "force" cracks to form along these thinned sections prior to use in the field. This pre-cracking strategy can elongate life of the protective layer (and, in turn, the underlying plug 118) because the cracks can accommodate additional thermal expansion of the part that occurs in the field to prevent additional crack formation and eventual flaking of the protective layer.

Figure 2:
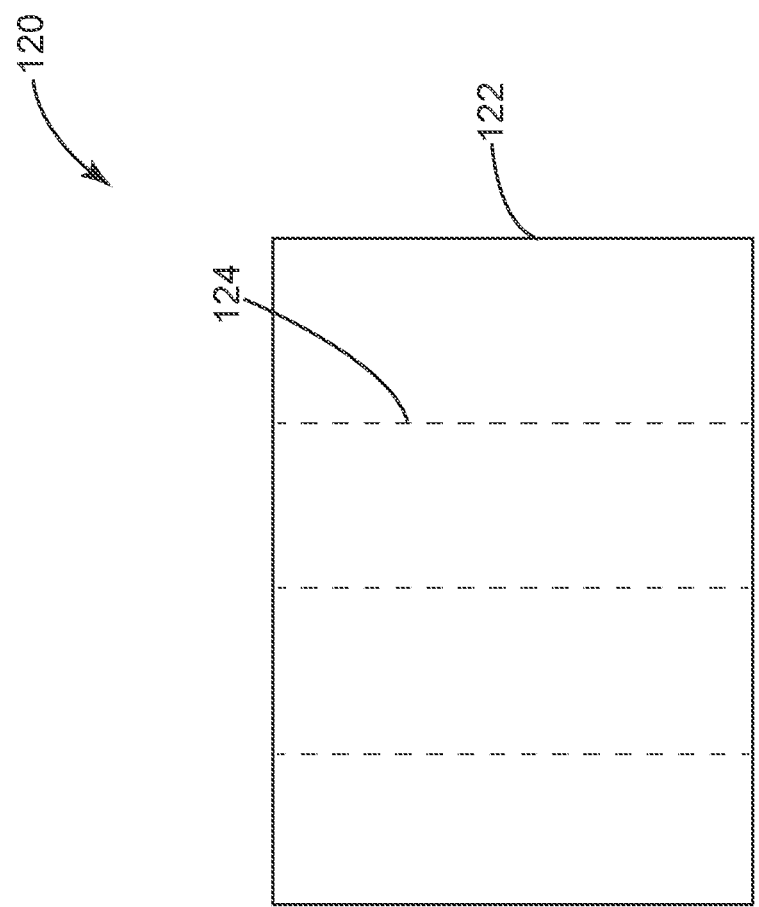
FIG. 2 depicts a plan view of an example of a coating for use on the closure member of FIG. 1.

FIG. 2 depicts a plan view for an example of the coating 120. This example forms a thin layer 122 (or multiple "layers 122") that covers all or most of the underlying plug 118. The thin layer 122 may comprise materials that are harder than the plug 118. This property is important to protect the plug 118 from damage that can occur in service. Crack "lines" 124 may populate at least part of the thin layer 122. The lines 124 may, by design, cause the thin layer 122 to fail before other parts of the thin layer 122. For example, the lines 124 may correspond with sections or areas of the thin layer 122 that are thinner than adjacent sections. These thinner parts may succumb to thermal cycling easier or faster than the thicker parts. Other features or anomalies may also help to facilitate crack propagation as well, for example, the lines 124 may comprise materials that are different that the rest of the thin layer 122 or the lines 124 may have dimensions or a cross-section that is prone to crack under thermal cycling or other stress.

Figure 3:
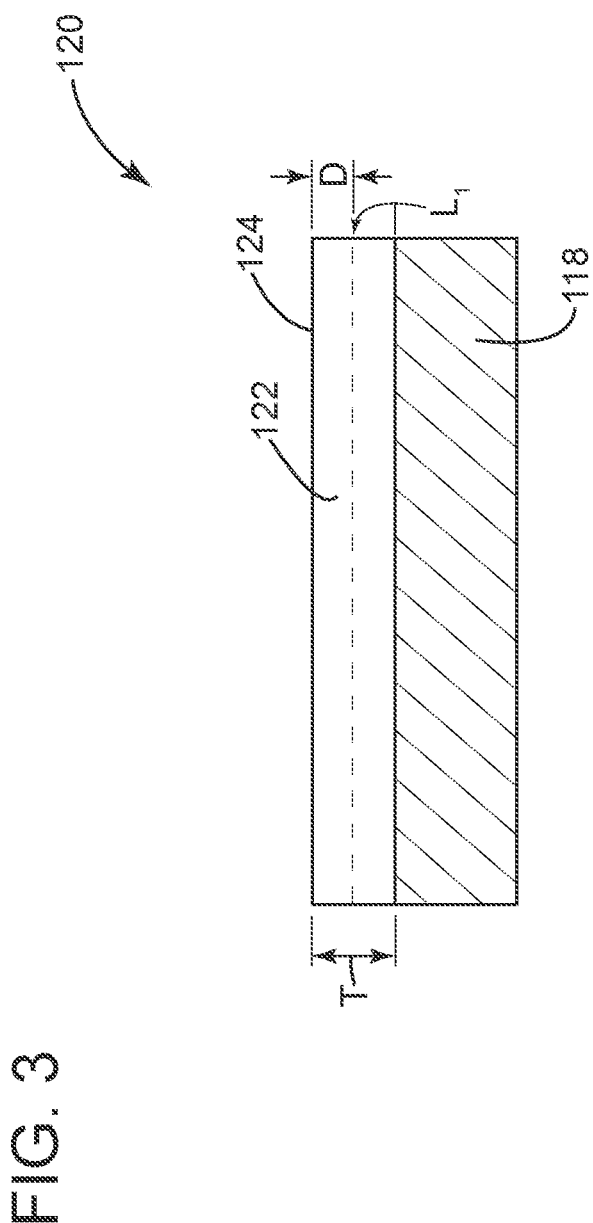
FIG. 3 depicts an elevation view of the cross-section of an example of a coating for use on the closure member of FIG. 1.

FIG. 3 depicts an elevation view of the cross-section of the coating 120 of FIG. 2. Configurations of the lines 124 may arrest crack formation to a maximum depth D. This configuration may stop the crack before it penetrates through the thickness T of the layer 122. This feature can improve protection because it prevents cracking of the entire protective layer. The remaining thickness (T–D) may preserve the conformal coating of the layer 124 over the underlying plug 118. This remaining, conformal layer is less susceptible to cracking because the existing cracks that develop at the lines 124 prior to service operate as stress reliefs that can accommodate for any additional thermal deviations that the part sees in the field. In one implementation, the layer 122 may include a material (identified generally as $L_1$) that helps to arrest crack development because it simply does not allow the cracks to propagate any further toward the plug 118. The material $L_1$ may foreclose the need to precisely engineer the lines 124 to consistently obtain the proper depth D and, thus, not expose any surface of the plug 118 to highly-erosive working fluid.

Figure 4:
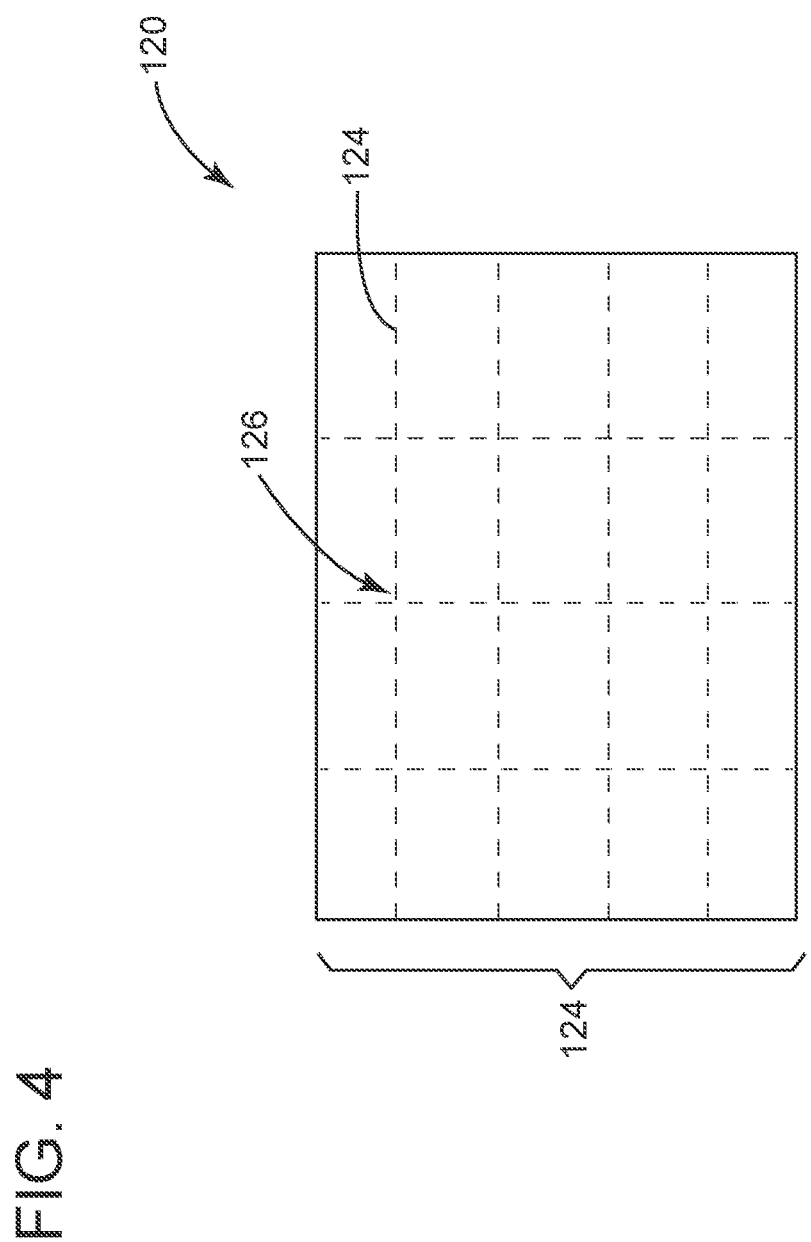
FIG. 4 depicts a plan view of an example of a coating for use on the closure member of FIG. 1.
Figure 5:
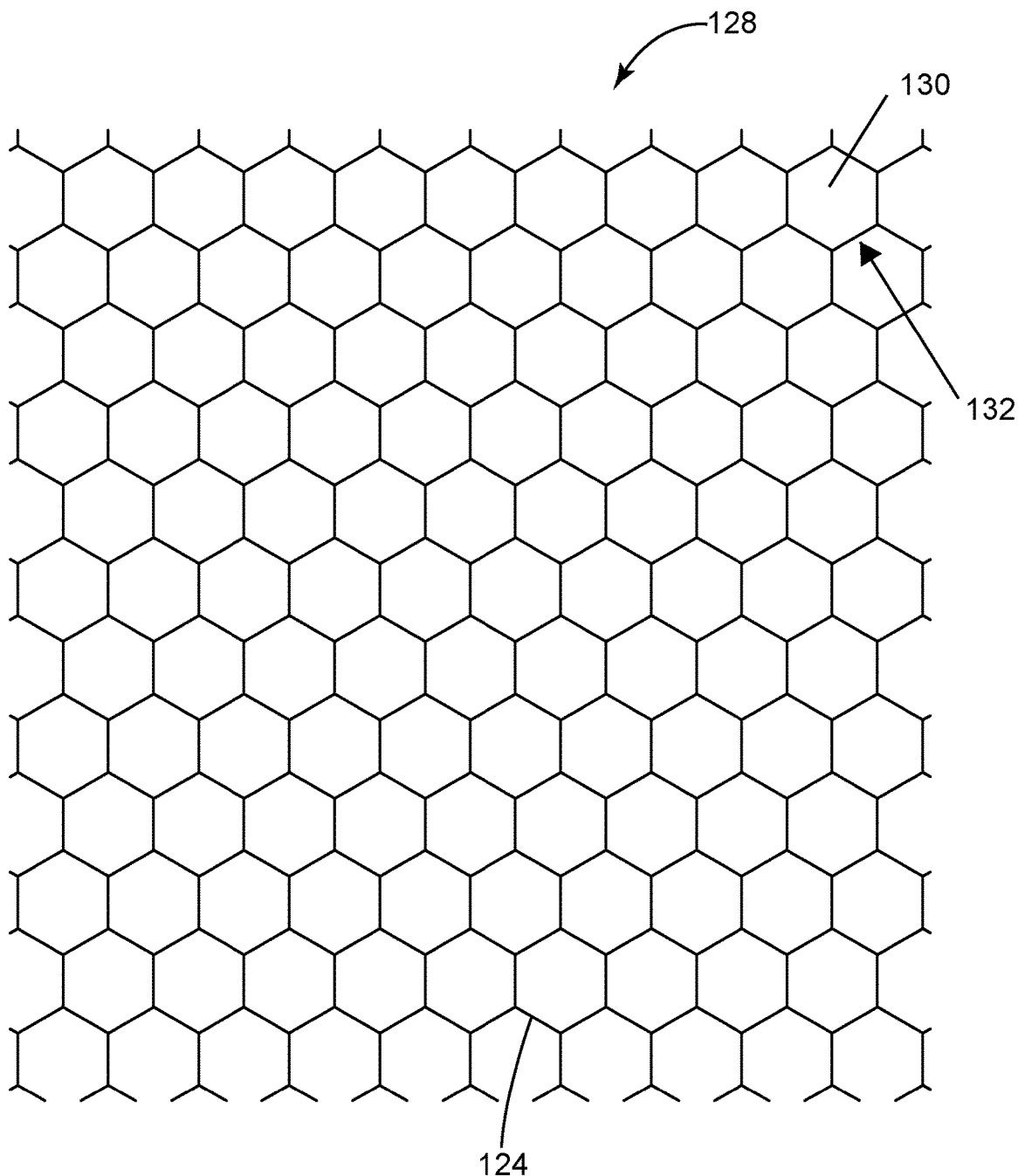
FIG. 5 depicts a plan view of an example of a coating for use on the closure member of FIG. 1.

FIGS. 4 and 5 depict plan views of examples of the coating 120. The lines 124 may form a crack profile 126 that defines a pattern 128. Examples of the pattern may form a grid, for example, in which lines 124 intersect with one another to form squares or rectangles. This disclosure contemplates that the design can form other shapes (e.g., triangles, diamonds, etc.), as well as combinations thereof. As best shown in FIG. 5, the grid may form hexagonal shapes. Post-thermal cycling, this design can cause pre-cracking that take on a visual appearance of "crocodile skin." This appearance is useful because it can alert manufacturers or operators that the part is ready for use in the field.

The pattern 128 may comprise a collection of individual tiles 130. Space or gap 132 may separate adjacent tiles 130 from one another. In one implementations, dimensions for the gap 132 may allow for contact between the printed tiles 130, for example, at the time of manufacture. This arrangement may keep working fluid away from the underlying plug 118 because the working fluid can't percolate or penetrate the "net zero" space between adjacent tiles 130, much like a uniform, conformal coating with the pre-defined cracking structure contemplated herein. Separation between the tiles 130 though may provide expansion relief because adjacent tiles 130 may move relative to one another to account for thermal expansion between the parts 118, 120.

Figure 6:
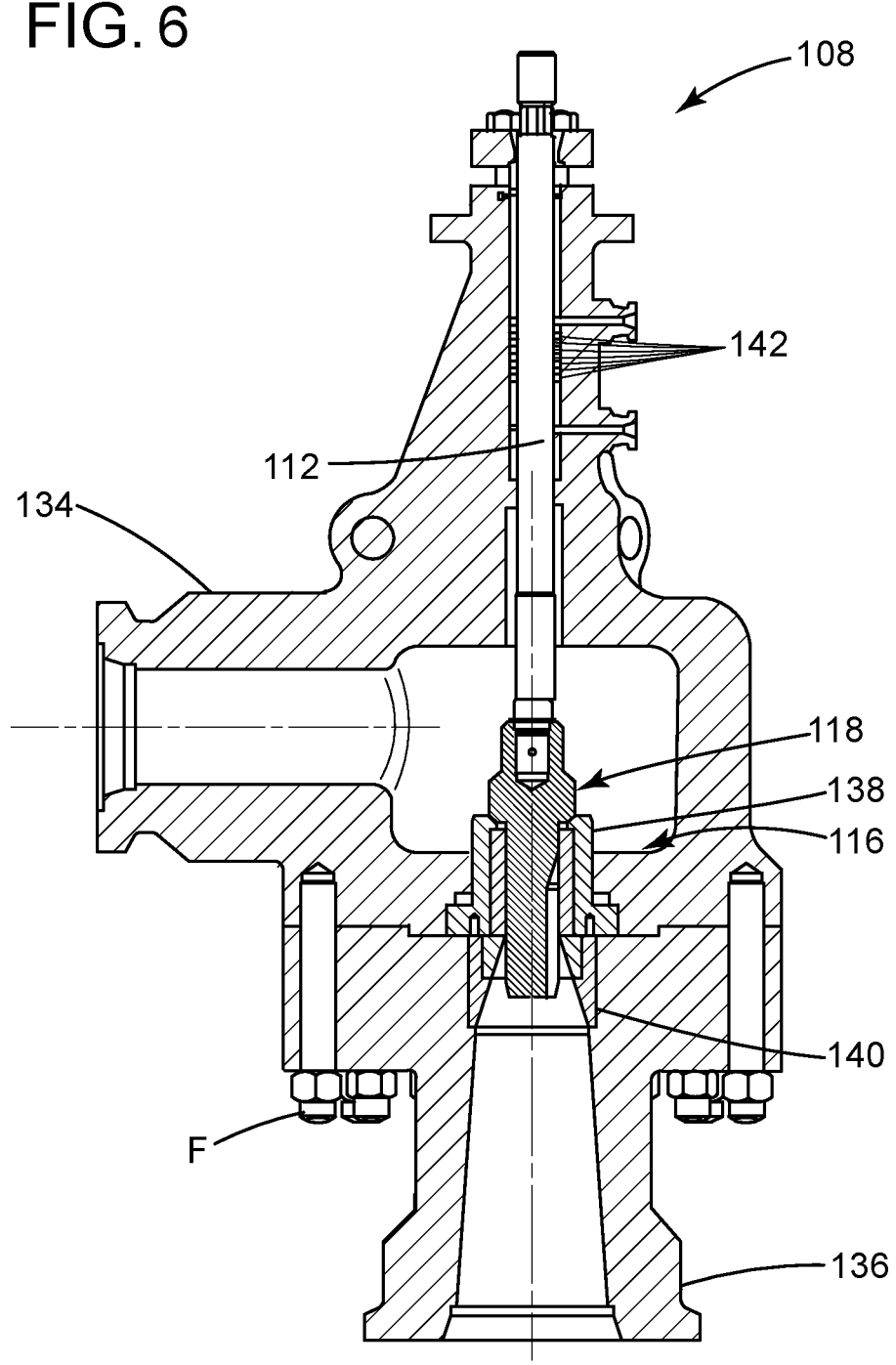
FIG. 6 depicts an elevation view of the cross-section of a flow control.

FIG. 6 depicts an elevation view of the cross-section of structure for the flow control 108. The valve body 110 may comprise an upper member 134 that secures with a lower member or "flange" 136. Fasteners F, like nuts and bolts, may work for this purpose. The seat 116 may comprise a seat ring 138. A venturi housing 140 may reside below the seat ring 138 in the flange 136. In one implementation, the valve stem 112 may extend through packing 142 in the member 134 to locate the plug 118 in proximity to a seat ring 138. The packing 142 is useful to allow movement of the valve stem 112, but prevent the flow control 108 from emitting fugitive emissions.

In view of the foregoing, the improvements herein offer a new approach to construct valve parts, like plugs or closure members, that reside in the flow of highly-erosive working fluids. This approach addresses operator concerns about life expectancy of certain parts on their process lines. These concerns frustrate use of certain materials because their inherent properties are not conducive with the working fluids. For example, hardened martensitic stainless steel lacks corrosion resistance to survive harsh or corrosive working fluids. Base-level austenitic stainless steels have the necessary corrosion resistance; but these materials are inherently too soft for mechanical loading seen in flow controls found in many process lines. On the other hand, high-performance alloys or ceramics, like Inconel or solid tungsten carbide, appear to meet requirements for corrosion, hardness, or strength. But many types of these materials are too brittle or, like other steels, become too brittle as hardness increases to survive under duress of harsh or corrosive working fluids. This weakness can lead to fracture under non-symmetrical mechanical loading, which may occur when particles or debris entrained in working fluid becomes caught between moving parts. Further, brittle materials often fail in response to vibration. These conditions may arise in high-pressure systems from a combination of pressure drops along the system and changes in direction of the high-velocity flow of working fluid.

The examples below include certain elements or clauses to describe embodiments contemplated within the scope of this specification. These elements may be combined with other elements and clauses to also describe embodiments. This specification may include and contemplate other examples that occur to those skilled in the art. These other examples fall within the scope of the claims, for example, if they have structural elements that do not differ from the literal language of the claims, or if they include equivalent structural elements with insubstantial differences from the literal language of the claims.

What is claimed is:

1. A valve, comprising:
   a moveable plug with a coating disposed thereon, the coating having crack lines forming adjacent tiled shapes arranged in a pre-determined pattern,
   wherein the crack lines result from thermal cycling of the coating on the moveable plug.

2. The valve of claim 1, wherein the crack lines form a gap separates the adjacent tiled shapes.

3. The valve of claim 1, wherein the crack lines form a gap having a depth that is less than the thickness of the coating separates the adjacent tiled shapes.

4. The valve of claim 1, wherein the crack lines form a gap that penetrates through the coating separates the adjacent tiled shapes.

5. The valve of claim 1, wherein the crack lines form a gap circumscribes the adjacent tiled shapes.

6. The valve of claim 1, wherein the crack lines form a gap having a depth that is less than the thickness of the coating circumscribes the adjacent tiled shapes.

7. The valve of claim 1, wherein the coating has a thickness between the adjacent tiled shapes that is thinner than the thickness at the adjacent tiled shapes.

8. The valve of claim 1, wherein material of the coating is different than material of the plug.

9. The valve of claim 1, wherein the pre-determined pattern defines the adjacent tiled shapes as hexagonal.

* * * * *